June 4, 1963  S. MITTY ET AL  3,092,395
CORRUGATED SHOPPING CART AND PARTS
Filed Dec. 14, 1961  3 Sheets-Sheet 1
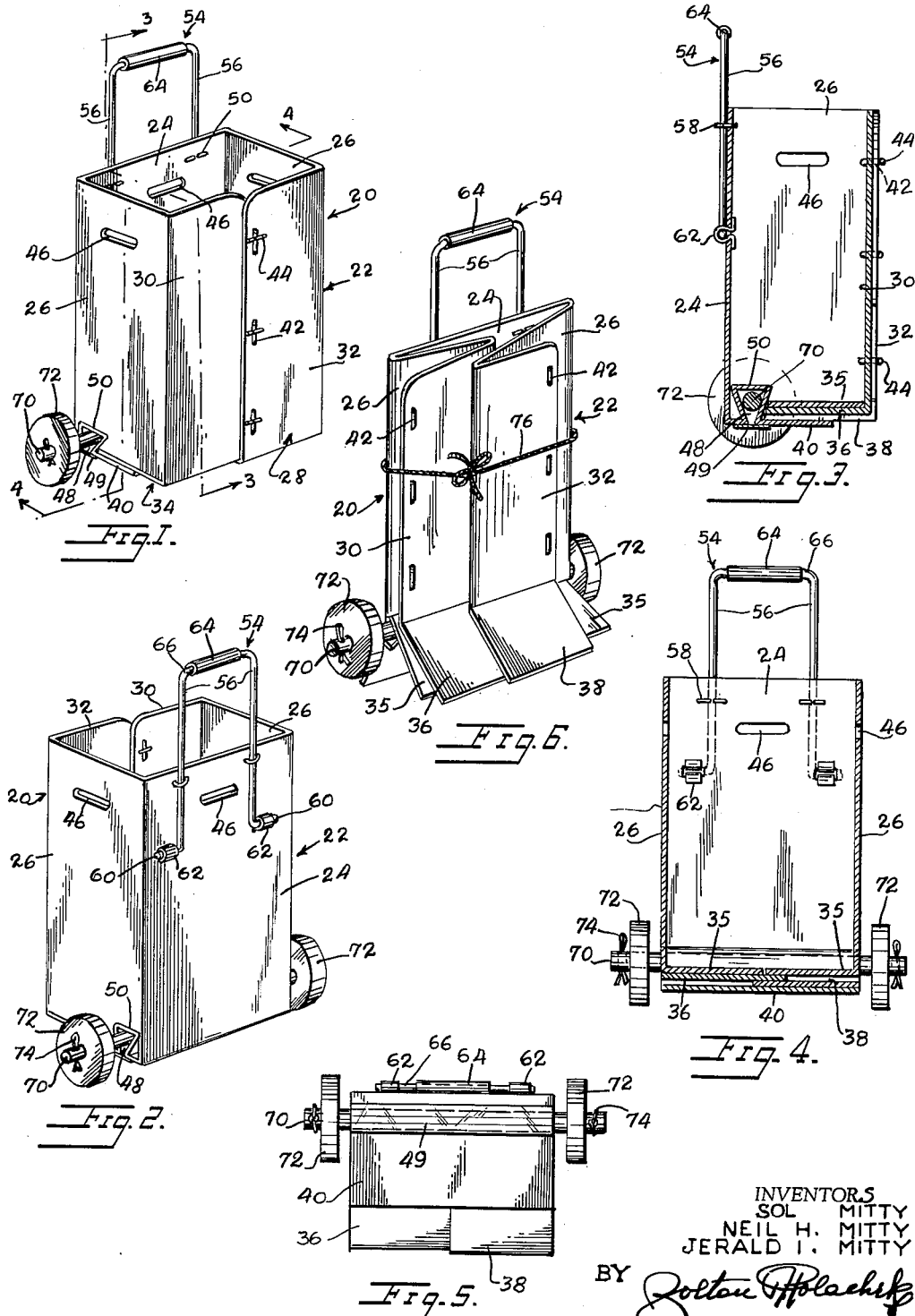
INVENTORS
SOL MITTY
NEIL H. MITTY
JERALD I. MITTY
BY Zolton Holachik
ATTORNEY

INVENTORS.
SOL MITTY
NEIL H. MITTY
JERALD I. MITTY
BY
ATTORNEY

June 4, 1963 S. MITTY ET AL 3,092,395
CORRUGATED SHOPPING CART AND PARTS
Filed Dec. 14, 1961 3 Sheets-Sheet 3
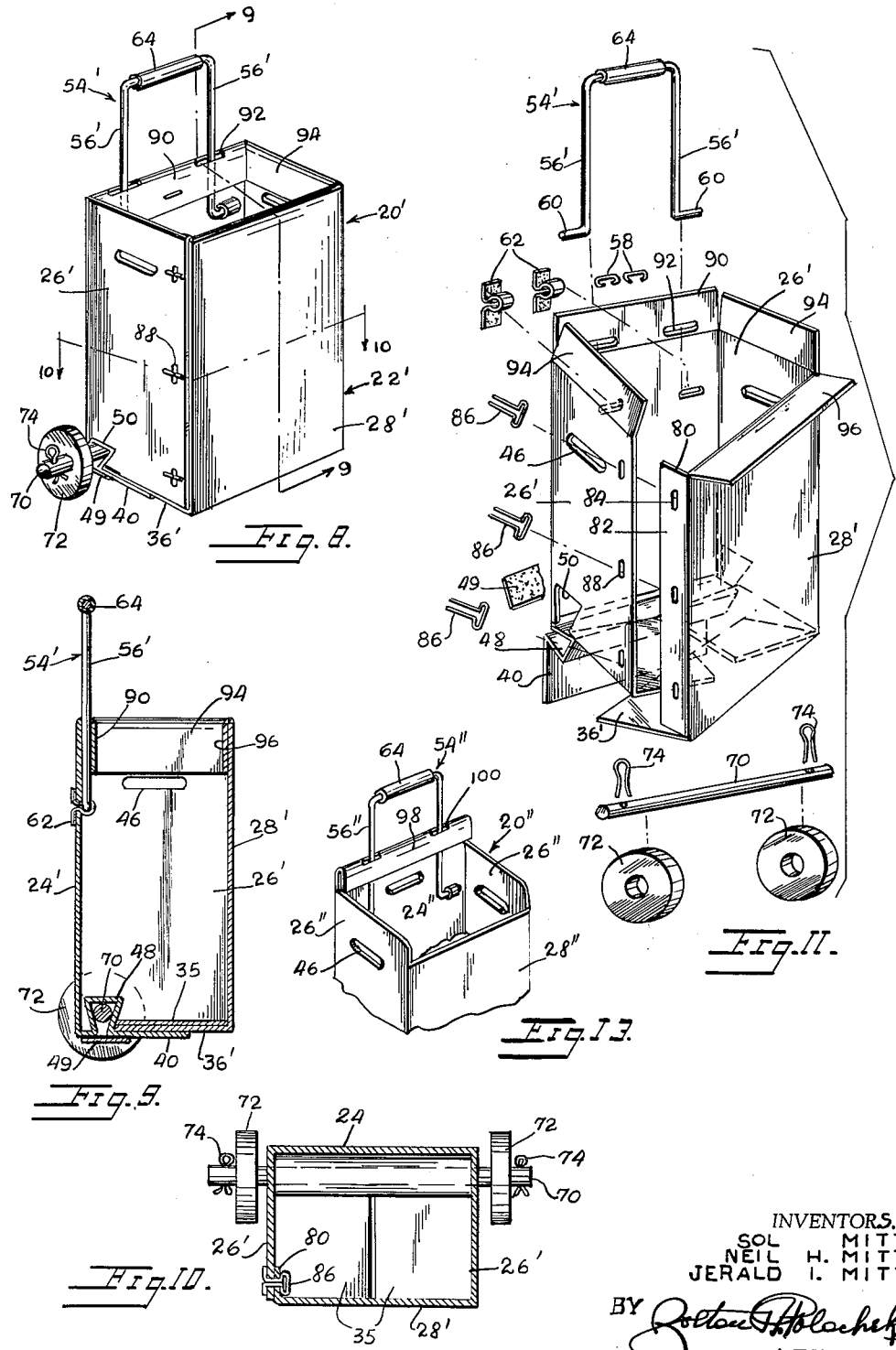
INVENTORS.
SOL MITTY
NEIL H. MITTY
JERALD I. MITTY
BY
ATTORNEY

United States Patent Office 3,092,395
Patented June 4, 1963

3,092,395
CORRUGATED SHOPPING CART AND PARTS
Sol Mitty, Neil H. Mitty, and Jerald I. Mitty, all of
144—45 78th Ave., Flushing, N.Y.
Filed Dec. 14, 1961, Ser. No. 159,385
1 Claim. (Cl. 280—36)

This invention relates to an improved shopping cart.

The invention is directed particularly at an expandable cart adapted for just one or several trips. The cart may be formed from a blank sheet of corrugated paperboard and is provided with a wheel assembly and a handle.

The corrugated body is prefabricated from one piece of material and is so designed that the unit will readily assemble into a shopping cart or into a regular shipping carton from the manufacturer to the market that can be reused to become a shopping cart by enclosing the axle, wheels and handle in the shipment, the carton being readily scored and slotted for reuse.

The body of the cart is so designed that the pinch groove axle holder allows the body to be reversible, that is, it may be turned inside out to show color, decoration design or advertising. When first used as a shipping container, the scuffed or soiled body will be reversed to the inside.

Particular features of the invention are the economical construction of the several parts, ease of assembly, utility for advertising purposes and decoration, folding of body for storing or carrying cart to market for reuse.

It is therefore a principal object of the present invention to provide a shopping cart with a body fabricated from corrugated paperboard, the body being collapsible and reversible.

Another object is to provide a corrugated paperboard shopping cart including a body, with attached handle and wheel assemblies.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a front and side perspective view of a shopping cart embodying the invention.

FIG. 2 is a rear and side perspective view thereof.

FIG. 3 is a vertical sectional view taken on the line 3—3 of FIG. 1.

FIG. 4 is a vertical sectional view taken on the line 4—4 of FIG. 1.

FIG. 5 is a bottom plan view thereof.

FIG. 6 is a front and side perspective view of the shopping cart in folded condition.

FIG. 8 is a view similar to FIG. 1 of a shopping cart embodying a modified form of the invention.

FIG. 9 is a vertical sectional view taken on the line 9—9 of FIG. 8.

FIG. 10 is a cross-sectional view taken on the line 10—10 of FIG. 8.

FIG. 11 is a spread perspective view of the shopping cart.

FIG. 13 is a top perspective view of the top end of a shopping cart embodying another modified form of the invention.

Figure 7:
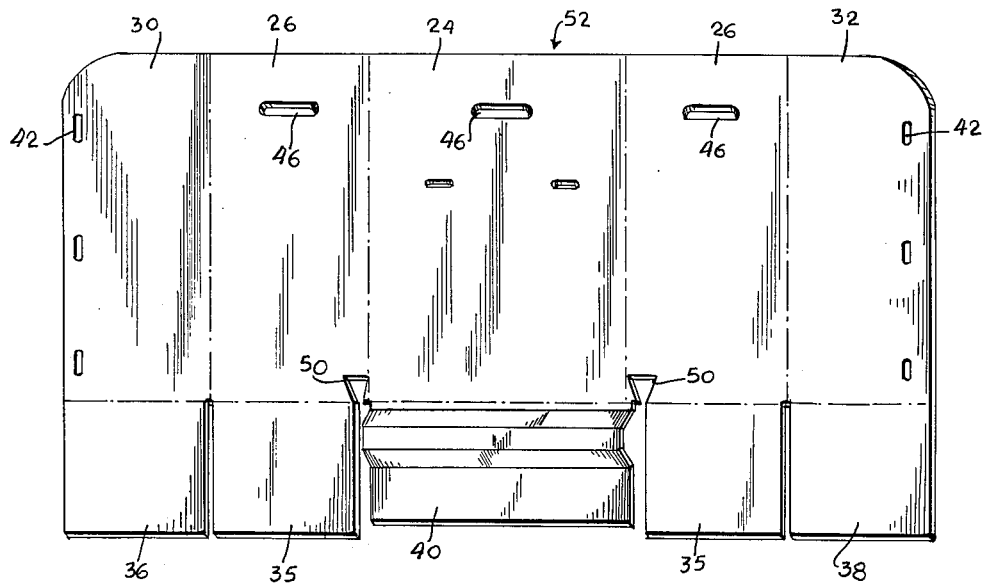
FIG. 7 is a top plan view on a reduced scale of the cardboard or corrugated sheet from which the cart of FIG. 1 was formed.

Referring in detail to the drawings and particularly to FIGS. 1 to 7, inclusive, a shopping cart embodying one form of the invention is shown therein and designated generally by the numeral 20. The cart 20 has a box-like body 22 which is formed from a blank sheet of corrugated paperboard. The cart is rectangular in configuration with a rectangular back panel 24, two side panels 26, a sectional front panel 28 including sections 30 and 32, a sectional bottom panel 34, including flaps 35 on the side panels 26 overlapping flaps 36 and 38 on the bottom of front panel sections 30 and 32, respectively, the latter flaps overlapping a bottom flap 40 on the back panel 24. Front section 32 overlaps slightly the front section 30. The overlapping portions of the front sections are formed with aligned spaced slots 42 which are in register and receive bent pronged pins 44 for holding the front sections secured to each other. The back and side panels are formed with elongated closed slots 46 serving as hand holes for manipulating the body 22. The inner and outer surfaces of the panels may be colored in contrasting colors or have decorations thereon of varying designs.

In accordance with the invention, the flap 40 on the bottom of back panel 24 is folded upon itself adjacent the junction with the back panel to form an inverted triangular-shaped bearing groove 48 extending across the flap 40 adjacent the back panel, the groove opening downwardly and being closed by a tape 49. The ends of the folded portions of the flap 40 constituting the groove are seated in triangular-shaped opposed openings 50, 50 in the side panels 26 at the bottom rear thereof. The groove 48 constitutes a bearing for an axle to be described later.

In FIG. 7, the paperboard blank 52 from which the box-like body 22 is formed is shown with the slots and openings in the panels and with the flap 40 in extended non-folded condition.

An inverted U-shaped handle 54 is mounted on the back panel 24 protruding upwardly thereof. The sides 56 of the handle extend through wire staples 58 on the back panel adjacent the top thereof and at their bottom ends are formed with bent ends 60 that are sprung into eyelets 62 mounted on the back panel. A round paper tube 64 reinforces the bight portion 66 of the handle providing a good hand grip.

An elongated round axle 70 is supported in the triangular pinch groove 48 formed in the flap 40 of back panel 24 and protrudes on both sides of the side panels 26. Wheels in the form of solid discs 72 are mounted on the protruding ends of the axle and are held from displacement by cotter pins 74.

The body 22 of the cart 20 is readily collapsed to the condition shown in FIG. 6 by merely withdrawing the pronged pins 44 extending through the slots 42 in the sections 30 and 32 of the front panel 28. When the pins are withdrawn, the side panels 26 and front sections 30 and 32 can be folded inwardly, the front sections overlapping the side panels with the flaps in overlapping condition as shown. With the body 22 thus collapsed, a rope 76 may be tied around the panels to hold them against accidental opening.

When it is desired to reuse the cart again, the panels can be turned inside out as the material readily folds either way along the joints between the panels and the flap 40 can be folded upwardly no matter which side of the back panel is exposed. The inner and outer surfaces of the panels may accordingly be colored or decorated so that the color or decoration will be exposed no matter which surface is on the outside.

In FIGS. 8 to 12, a shopping cart 20' is shown embodying a modified form of the invention. Cart 20' differs from the cart 20 mainly in the construction of the cart body 22'. In this form of cart body, the front panel 28' is solid and of one-piece construction with a solid and single flap 36'. The front panel 28' has a narrow flap 80 along one long edge thereof. Slots 84 are spaced along the flap 80 to receive pronged pins 86 extending through spaced slots 88 in the long edge of the adjacent side panel 26' to secure the joint between the front and adjacent side panel.

Furthermore, the back panel 24' is formed with an inturned flap 90 formed with spaced slots 92 to permit the sides 56' of the handle 54' to pass therethrough. The side panels 26' are formed with inturned flaps 94 at the top, and the front panel 28' is formed with an inturned flap 96 at the top.

Figure 12:
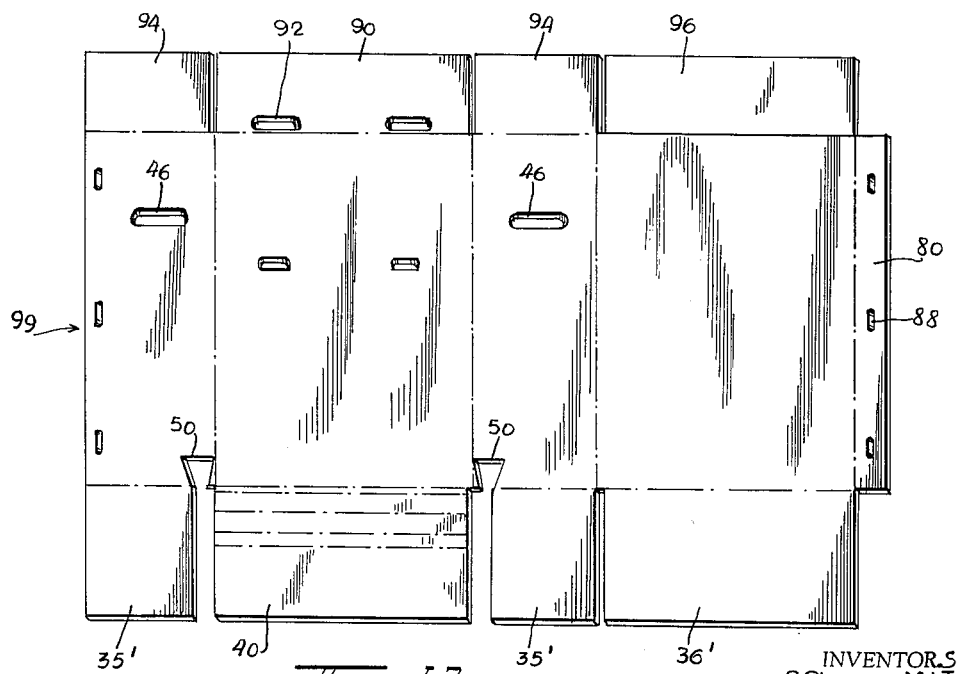
FIG. 12 is a top plan view on a reduced scale of the cardboard or corrugated sheet from which the cart of FIG. 8 was formed.

In FIG. 12, the paperboard blank 99 from which the box-like body 22' is formed is shown with the slots and openings in the panels already formed and with the flap 40' in extended non-folded condition.

The modified form of shopping cart 20" shown in FIG. 13 differs from the cart 20' in that the back panel 24" extends above the side panels 26" and is formed with an inturned flap 98 provided with spaced slots 100 to receive the sides 56" of the handle 54". The front panel 28" is shorter than the side panels 26" and the front and side panels are without flaps at the top ends thereof.

In all forms of the cart shown, the cart is characterized by economy in materials and labor required to fabricate the cart. The cart may be provided for one-time use or for several shopping trips. The cart also has general household utility.

While we have illustrated and described the preferred embodiments of our invention, it is to be understood that we do not limit ourselves to the precise constructions herein disclosed and that various changes and modifications may be made within the scope of the invention as defined in the appended claim.

Having thus described our invention, what we claim as new, and desire to secure by United States Letters Patent is:

A collapsible and reversible shopping cart comprising a box-like body having a rear panel, side panels and a sectional front panel, said panels having overlapping bottom flaps constituting a bottom panel, the sections of the front panel having overlapping long edges, said overlapping edges having aligned spaced slots, pronged pins in the slots for detachably fastening said overlapped edges to each other, a handle on the rear panel protruding upwardly therefrom, and a wheel assembly mounted on the bottom panel, the mounting of the wheel assembly constituted by a fold in the flap on the rear panel adjacent the rear panel, the fold in the flap on the rear panel forming a triangular-shaped groove opening downwardly and wherein a tape closes the bottom opening in the groove.

References Cited in the file of this patent

UNITED STATES PATENTS

| | | |
|---|---|---|
| 2,564,939 | Weast | Aug. 21, 1951 |
| 3,035,848 | Parker et al. | May 22, 1962 |